Oct. 10, 1939.　　W. E. ROSE ET AL　　2,175,571
SHOCK ABSORBER FOR SAFETY BELTS AND THE LIKE
Filed Jan. 4, 1938
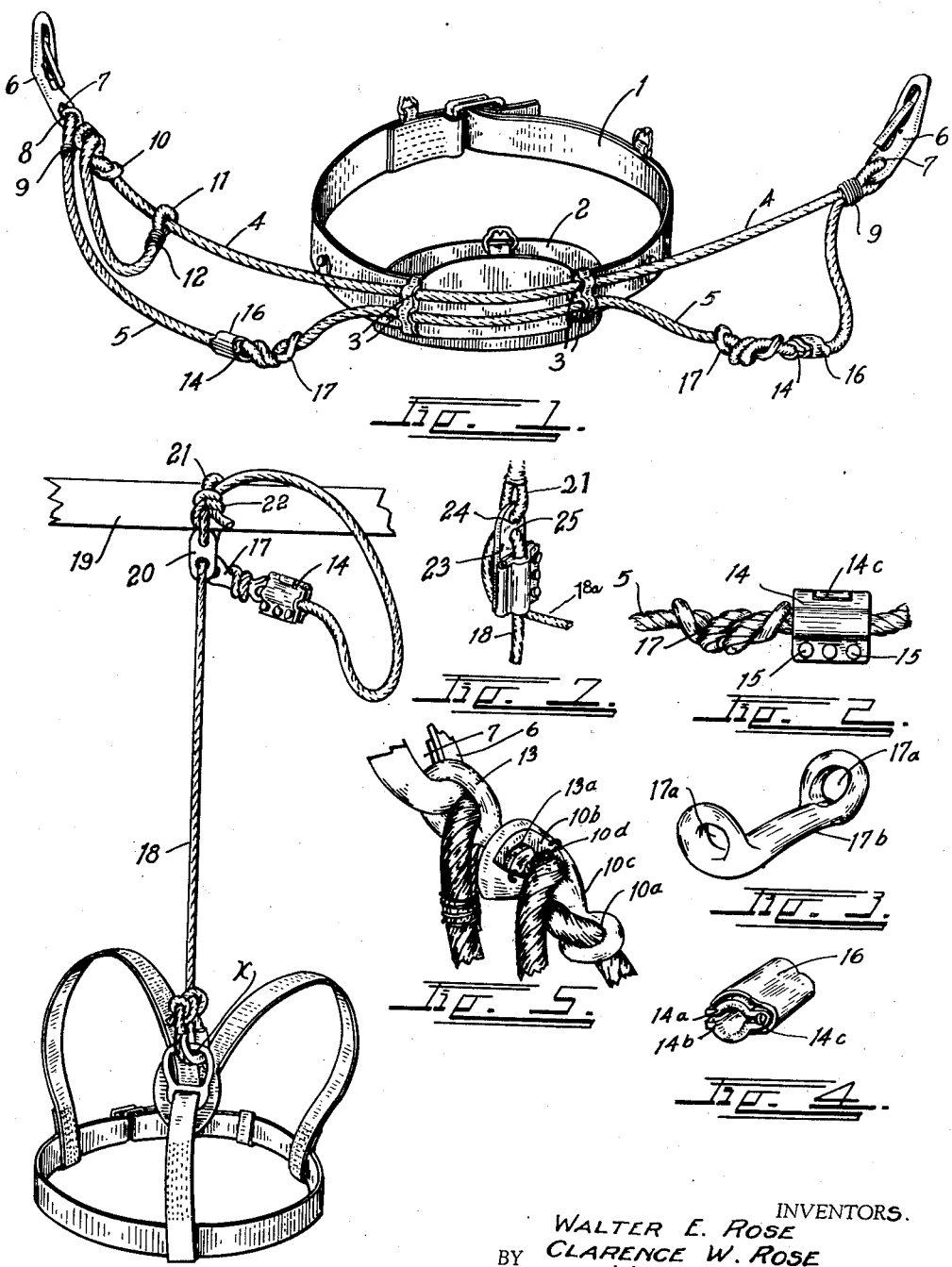
INVENTORS.
WALTER E. ROSE
BY CLARENCE W. ROSE
WHITEHEAD & VOGL
PER Earle Whitehead ATTORNEYS.

Patented Oct. 10, 1939

2,175,571

UNITED STATES PATENT OFFICE 2,175,571

SHOCK ABSORBER FOR SAFETY BELTS AND THE LIKE

Walter E. Rose and Clarence W. Rose, Denver, Colo.

Application January 4, 1938, Serial No. 183,291

5 Claims. (Cl. 227—49)

This invention relates to shock absorbers for safety belts and the like, and particularly to the provision, in such devices of friction means automatically operable by the falling of the wearer of the device, for retarding and lessening the momentum of the falling wearer of the device, whereby to ease the wearer to a stop without the jerk and strain on the safety device and the shock to the wearer now usually resulting from such falls.

An object of the invention is to provide, in safety belts and like devices which are designed to definitely stop the fall of an operator, frictional means automatically operable, by the fall of the operator, to retard the fall prior to the final stopping of the fall.

A further object is the provision, in devices of the class described, of means frictionally engaging a rope or the like forming a part of the device and in slidable relation to such rope or the like, whereby to retard the fall of the wearer prior to his reaching the limit of the fall permitted by the device.

A further object is to provide, in a device of the class described, means for regulating and adjusting to the weight of the operator, the frictional grip of such devices upon the rope or like element.

A further object is the provision of such frictional retarding means in efficient, economical, simple and compact form whereby, without substantial additional expense, such frictional retarding means may be added to safety belts and the like without materially encumbering, complicating or increasing the weight of such devices or the appliances commonly in use as a part of or in cooperation therewith.

The invention is applicable to a variety of safety appliances, as will specifically appear in or be obvious from the following specification and the accompanying illustrative drawing, but is here illustrated and described as applied to safety devices for window cleaners, men working on scaffolds, etc. The application to other safety devices will be obvious.

With the foregoing and other objects in view, as will hereinafter more fully appear, the invention comprises certain novel constructions, combinations, and arrangements of parts as will now be described, and as defined in the appended claims and as illustrated in the accompanying drawing, in which Fig. 1 is a perspective view of a safety belt for window cleaners, with its usual accompanying appliances, but embodying the present invention.

Fig. 2 is a detail view, enlarged over the scale of Fig. 1, of a friction grip and snubber installed upon the safety rope.

Fig. 3 is a further enlarged detail view of the snubber.

Fig. 4 is a detail view of the grip enclosed in a C spring.

Fig. 5 is a detail view of the swiveled adjusting snubber.

Fig. 6 illustrates an application of the invention to a belt or harness adapted for use by a worker on a scaffold, or in other positions in which the usual window cleaner's belt would not be used.

Fig. 7 is a detail of a supporting eyelet and grip combined into a single member.

Safety belts for window cleaners, etc., have for many years been in use, and subject to many variations and improvements. For a long time such belts have been provided with two ropes, namely, a service rope and a safety rope, the service rope having its ends adapted for attachment to suitable anchors in the window casing, and being adjustable to a length which will permit the operator to lean backward away from the window sufficiently to permit him to efficiently perform the window cleaning operation. The service rope heretofore in use has been provided with means for positively locking it at adjusted length. The safety rope, now in use, likewise has its ends attached to the same means as the service rope for anchoring in the window casing, but is longer than the service rope, it being intended that, under normal conditions, the safety rope shall not function and not be subjected to strain or wear and to act simply as a reserve rope which comes into play and functions only in case of the breaking of the service rope.

The principal cause of the falling of a window cleaner is his stepping out on the window sill after attaching one end of the ropes to the anchorage and then falling before the other end of the ropes is securely anchored. In such a case the belt, with the service and safety ropes now in common use as above described, frequently fails to stop the fall of the operator because the anchorage pulls out or some other part of the equipment gives way, or stops him with a sudden jerk resulting in injury, for the reason that the full momentum of his fall is exerted in a single jerk when the end of one or the other of the ropes is reached. If the service rope be subjected to this jerk it may break or severely shock the operator or cause some part to give way. If it breaks, then the operator gets a second shock on reaching the end of the safety rope, and that may also be broken or some part caused to give way by the jerk.

The present invention is designed to retard the fall of the operator, in such and similar cases, before he reaches that point on either rope at which the fall is finally stopped so as to substantially reduce the momentum and lessen the strain and jerk on that rope the end of which is first reached, and thereby substantially reduce the danger of breakage of any part of the device, and also to reduce the danger of injury to the operator from either shock or fall. This is accomplished by employing friction means, slidable with relation to the ropes but in such substantial frictional contact with the ropes that the fall of the operator will be very greatly retarded.

The means to these ends are illustrated in the accompanying drawing, where a belt is indicated at 1, preferably provided with a suitable back pad 2, and with a plurality of double rope eyes 3 through which the service rope 4 and the safety rope 5 are guided and freely slide, it being understood that the rope eyes are attached to the belt in such a manner as to withstand the maximum strain to which they can be subjected by the falling of the operator.

Terminals 6, of any suitable construction for engagement with the anchors in the window casings (not shown), are provided with eyes 7 for the attachment of the ropes.

The service rope and the safety rope are herein referred to as if they were separate and distinct pieces of rope, and for practical purposes they are such, though the apparatus may conveniently be constructed, as here illustrated, by using a single piece of rope, one end of which is securely attached to one of the terminals at 8, the rope then being threaded through the lower eyes in the rope-eyes 3 and then through eye 7 of the other terminal, whereupon it is returned and bound upon itself by any suitable means, as wire winding 9, thus forming the safety rope 5, of a length which will be in excess of the maximum of the length of the service rope. The service rope 4 is then threaded back through the upper eyes of the members 3, through the adjusting snubber 10, the projecting end then being loosely looped around itself as at 11 and bound by suitable means as at 12, the looping 11 and the binding 12 being provided for the purpose of supporting the loose end, avoiding entanglements and preventing the complete withdrawal, even under excessive strain, of the service rope from adjusting snubber 10. In this manner two separately functioning ropes may be provided out of the single rope, but obviously two separate pieces of rope may be used if desired.

The service rope is adjusted to the desired length for operation by slacking it at adjusting snubber 10 and drawing the rope through this member in one direction or the other in order to lengthen or shorten the length of rope between the terminals 6, whereupon the rope is tightened around and through adjusting snubber 10. A part of the present invention lies in the structure of adjusting snubber 10 and in its combination with the service rope, and in this connection it will be noted by reference to Fig. 5 that the adjusting snubber 10 comprises an eye 10a and a loop 10b through which the rope is threaded, a connecting shank 10c around which the rope is wound or snubbed between the eye and the loop, and a spring 10d functioning as a detent to hold the rope in snubbed position under normal operating conditions. It will also be noted that this adjusting snubber is preferably devoid of edges which would cut the rope, the shank being preferably rounded and, at all points where the rope contacts this member, rounded or smooth surfaces are preferably provided in order to avoid cutting the rope.

The adjusting snubber is swiveled at 13a to the ring 13 which passes through the eye 7 of the terminal, thereby securing adjusting snubber 10 and the attached end of the service rope to the terminal, but providing for the rotation of the adjusting snubber relative to the terminal in order to avoid twisting of the ropes.

The safety rope is preferably attached to the ring 13 rather than through the eye 7.

The length of the shank 10c between the eye 10a and the loop 10b, is such as to give the desired snubbing effect, it being understood that an abrupt or sharp turn around the shank gives the greater snubbing effect. The threading of the rope through the eye, around the shank and through the loop, under the resilient detent 10d, snubs the rope and holds the rope from slipping through the adjusting snubber in response to any pulling exerted upon the rope under ordinary operating conditions—that is to say that, it will hold the rope against slipping when the service rope is pulled by the operator leaning outwardly from the building into the service rope. This snubber is so constructed that when the rope is threaded therethrough and therearound it will hold against any pull resulting from any normal operations, but will allow the rope to slip therethrough when any pull greatly in excess of the normal is exerted thereon, so that if the operator falls and thereby exerts a sudden and excessive pull upon the service rope, said rope will slip through the adjusting snubber until the end of the service rope is reached, or until the fall is stopped, prior to reaching the end of the service rope, by the friction means on the safety rope which will be hereinafter described.

The above described construction and operation of the service rope in combination with the adjusting snubber 10 provides an arrangement whereby the service rope may be readily adjusted to the length desired for normal operation in view of the width of the window to be cleaned, and provides a service rope which will resist all normal pulls and strains and remain fixed at that length during all normal operating conditions. At the same time, however, this construction and combination provides a service rope which, in case of the fall of the operator resulting from the failure to securely engage, or from the disengagement of, one of the terminals, will not be subjected to the jerk or strain on the service rope to which it would be subjected if it were definitely and positively locked at the length desired for the particular job in hand. On the contrary when, in case of a fall, the operator reaches the end of the service rope at its then adjusted length, instead of exerting on the rope a sudden jerk to the extent of the full momentum of the falling operator, the rope begins to slip through the adjusting snubber and permits the fall to continue until the end of the service rope is reached or the fall is stopped by the friction means on the safety rope, but in the meantime the speed and momentum of the fall will be partially retarded by the adjusting snubber 10. It will be obvious that even in case of the slipping and falling of an operator when both terminals are anchored, the retarding effect of adjusting snubber 10 will retard the fall and lessen the ultimate jerk.

In the above description of the threading of the safety rope through the mechanism no mention was made of the frictional retarding means attached thereto. This will now be described.

The frictional retarding means applied to the safety rope comprises means which may be slid along the rope when sufficient pressure be exerted thereon but which will, during such sliding, maintain a frictional grip upon the rope to an extent sufficient to substantially retard the sliding movement of the means along the rope and ordinarily to stop the fall of the operator before the end of the rope is reached.

This frictional retarding or checking means comprises a grip 14, being a member of suitable material gripping the rope and adapted, when clamped to the rope, to exert a substantial, uniform frictional pressure or grip upon the rope throughout the length of the grip and substantially throughout the peripheral surface of the rope. Preferably this member is formed of two halves 14a and 14b, each having an approximately semicircular longitudinal groove, hinged together at 14c on one edge and provided with suitable fastenings for drawing together the unhinged edges of the two halves and thus gripping the rope in the grooves. These clamping means may consist of bolts 15 or any other suitable means for drawing the edges of the two halves together and gripping the rope, and may include any suitable resilient means (not shown) for permitting slight spreading of the two halves of the grip in case of unevenness of the rope. Such resilience and clamping means may, however, be provided by the use of a C spring clamp 16 which substantially encloses the grip, the jaws of the spring engaging and normally forcing together the unhinged edges of the two halves of the grip, all as clearly illustrated at Fig. 4. The end edges of the grooves are preferably rounded or so smoothed as to avoid cutting the rope as it slides through the grip. The grip is preferably made long enough to bridge any lumps in or unevenness of the rope and give a smooth sliding movement along the rope instead of the jerky uneven action which would result from sliding a short grip along a rough or coarse rope.

The frictional grip and the resulting retardation of the fall may be greatly increased by combining with the grip a snubber 17, shown in detail at Fig. 3, which snubber comprises a plurality of eyelets 17a, preferably having rounded inner edges and connected by a preferably rounded shank 17b, it being understood that in use the rope is threaded through one of the eyelets, around the shank, and then through the other eyelet, whereby the rope is snubbed around the shank, resulting in the requirement of a heavy pressure or pull to cause the snubber to slide along the rope.

In Fig. 1 and Fig. 2 there are illustrated a grip 14 and snubber 17 in engagement with the safety rope and in proximity to each other. In Fig. 1 the combination of grip and snubber is illustrated as positioned upon the safety rope on each side of the operator's belt, and this is the preferable and proper construction. It will be noted that between these frictional means the safety rope is threaded through the rope eyes 3 of the belt 1, and that when the operator falls the rope eyes 3 will move along the safety rope in one direction or the other, and as this movement continues the rope eyes will contact one or the other of the frictional means, according to which end of the rope is unattached and hanging down, and will exert a pressure thereon tending to cause the frictional means to slide along the rope, but, at the same time, to retard the fall of the operator by reason of the opposition of the friction on the rope to the sliding pressure of the rope eyes. When the snubbers are used as in the illustration, the rope eyes will of course contact the snubber therebelow and exert the sliding pressure thereon and transmit the sliding pressure through the snubber to the grip. If the snubbers be eliminated, then and in that case the rope eye will directly contact the grip and exert the sliding pressure directly thereon.

The positioning of the frictional means upon the safety rope is, to a considerable extent, a matter of judgment and convenience. Obviously these means will be placed at such a position on the safety rope that they will not contact the rope eyes 3 on the belt during the normal shifting of position by the operator while cleaning the window, because such a contact would interfere with the free movement of the operator. Beyond this point the frictional means are so positioned that the rope eyes will contact the frictional means on the safety rope before the operator has reached the limit of extension of the service rope, so that the fall will be substantially retarded and ordinarily stopped before the limit of extension of either rope is reached.

The snubber 17 is here shown as having a sufficient length of shank 17b to permit of a double bight of the rope therearound between the eyelets 17a, but the invention is not limited in this regard to any dimensions or proportions of the snubber or any of its elements, as the details of construction may be varied to suit conditions encountered in operation. The same is true as to the details of construction of the other structures herein described.

In Fig. 6 there is illustrated an application of this invention to a belt or harness adapted for use by a man working on a scaffold or other support. The belt or harness may be of any suitable construction, and is conventionally indicated at the bottom of the figure. From this belt or harness, and attached thereto by any suitable means conventionally indicated at X, there extends the rope 18, which is suspended from any suitable support, as beam 19, by any suitable means, as double eyelet 20, fastened to the beam 19 by any suitable means, as rope 21, the rope 18 passing through the lower eye in the double eyelet 20. The end of the rope 18, after passing through the lower eye in the member 20, is secured in any suitable manner to support the weight of a falling operator, as indicated at 22, and between the member 20 and the fastening 22 the frictional means, forming a part of the present invention, is threaded on the rope 18, this frictional means here being illustrated as comprising a grip 14 and a snubber 17.

In this case the snubber and the grip are adjusted on the rope 18 in such manner that the snubber 17 will contact the member 20 and normally hold the rope 18 at the desired length below the member 20, so as to permit the operator free movement upon the scaffold or other support for the desired operation without hindrance by the rope 18. Should the operator fall, the pull on the rope 18 will draw the snubber 17 (on the grip 14 if no snubber be used) tightly against the member 20, and the rope will then be drawn through the grip 14 and the snubber 17 which will exert friction thereon to retard and, if properly adjusted, to stop, the fall. In any event the fall will be retarded until all slack in the rope 18 has been drawn through the frictional means 14—17, at which time the rope 18 has been drawn out to its limit, and the fall will be stopped without a sudden and excessive jerk and strain on the rope and with the minimum danger of breaking the rope or injury to the operator.

The member 20 and the grip 14 may be combined into a single member as illustrated in Fig. 7 wherein the double eyelet designated as 20 is modified in form and affixed to or formed integral with and supports the grip. This modified double eyelet is here designated as 23, having eyelet 24 for the anchor rope 21 and eyelet 25 for the rope 18, the normally slack part of the rope 18 being designated as 18a. In both embodiments rope 18 bends over the lower edge as it slides through the lower eyelet in case of abnormal pull. In the embodiment in Fig. 6 it will be the taut part of rope 18 that slides over this lower edge while in the Fig. 7 embodiment it is the slack part of rope. The Fig. 7 embodiment lessens the danger of damaging the rope in being bent around and sliding over the lower edge of the eyelet.

We have described elements 4, 5 and 18 as ropes, but if straps or other equivalent means be used instead of ropes, the adaptation of the invention thereto will require only those changes in the shape or structure of the friction means which will be necessary and obvious to make such friction means fit and frictionally grip such strap or other means.

While we have described the construction and operation of the invention only as applied to window cleaning, work on scaffolds, etc., it is obvious that the invention may be used with like results in any apparatus in connection with which a person is attached to a rope, strap, etc., and is intended to or may fall and cause a sudden jerk on such rope, strap, etc., and/or sudden jolt or shock to himself.

Details of construction of the various elements have been herein described, but the invention is not limited to such details, as various changes therein and modifications thereof will be obvious to those skilled in the art, but within the spirit and scope of the invention, the foregoing specification and the appended claims.

We claim:

1. In a safety device, in combination, a rope anchored at one end and normally slack, an operator's belt engaging the rope, means at the other end of the rope for preventing the movement of the belt therebeyond, a retarder frictionally engaging the rope and operating means slidably engaging said rope and adapted for engagement with said retarder automatically by the falling of the operator wearing the belt, whereby the weight of the falling operator will bear upon and slide the retarder along the rope, the sliding of the retarder being opposed by its friction on the rope.

2. In a safety device, in combination, a rope adapted to be anchored at each end, an operator's belt slidably engaging the rope, retarders frictionally engaging the rope on each side of the belt and spaced from the belt and from the ends of the rope whereby, in case of the fall of the operator, when but one end of the rope is anchored, the rope-engaging means on the belt will engage the retarder and cause the fall to be checked by the friction grip of the retarder upon the rope.

3. A safety device comprising, in combination, an operator's belt having guideways for ropes, a service rope and a safety rope slidable in said guideways and having terminal attaching means at the ends of said ropes, means for adjusting the length of the service rope between said terminals, the safety rope being longer than the service rope, said adjusting means being adapted to permit said service rope to slip therethrough to its full length when subjected to abnormal pull and slidable means frictionally gripping the safety rope between the belt and the terminals.

4. In a safety device a rope anchored at one end and normally slack, an operator's belt attached to the rope, means for preventing movement of the belt beyond the end of the rope when fully extended and slidable frictional means on the rope adapted to retard the extension of said rope to its full length and comprising a plural membered grip upon the rope and means for resiliently holding said members in gripping relation to the rope.

5. In a safety device, a rope anchored at one end and normally slack, an operator's belt attached to the rope, means for preventing movement of belt beyond the end of the rope when fully extended and retarding means on the rope comprising in combination a snubber and a plural membered grip and means for resiliently holding said members in gripping relation to the rope.

WALTER E. ROSE.
CLARENCE W. ROSE.